United States Patent
Groarke

(10) Patent No.: US 11,282,049 B2
(45) Date of Patent: Mar. 22, 2022

(54) MULTI-NETWORK SYSTEMS AND METHODS FOR LINKING STORED ON-FILE DATA WITH PROFILE DATA

(71) Applicant: MasterCard International Incorporated, Purchase, NY (US)

(72) Inventor: Peter Groarke, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 396 days.

(21) Appl. No.: 15/279,679

(22) Filed: Sep. 29, 2016

(65) Prior Publication Data

US 2018/0089648 A1 Mar. 29, 2018

(51) Int. Cl.
*G06Q 20/10* (2012.01)
*G06Q 20/14* (2012.01)
*G06F 16/951* (2019.01)
*G06Q 20/02* (2012.01)

(52) U.S. Cl.
CPC ......... *G06Q 20/102* (2013.01); *G06F 16/951* (2019.01); *G06Q 20/02* (2013.01); *G06Q 20/027* (2013.01); *G06Q 20/14* (2013.01)

(58) Field of Classification Search
CPC ...... G06Q 20/10; G06Q 20/14; G06Q 20/102; G06Q 20/02; G06Q 20/027; G06F 17/30; G06F 16/951
USPC ................................................ 705/4, 38, 40
See application file for complete search history.

(56) References Cited

U.S. PATENT DOCUMENTS

| 6,226,364 B1 * | 5/2001 | O'Neil | H04M 15/88 |
| | | | 379/112.01 |
| 7,379,901 B1 * | 5/2008 | Philyaw | G06Q 20/10 |
| | | | 705/17 |
| 7,493,283 B1 * | 2/2009 | Philyaw | G06Q 20/10 |
| | | | 705/39 |

(Continued)

OTHER PUBLICATIONS

Wikipedia. "Web API". Sep. 19, 2016. https://en.wikipedia.org/w/index.php?title=Web_API&oldid=740162816 (Year: 2016).*

(Continued)

*Primary Examiner* — Narayanswamy Subramanian
*Assistant Examiner* — Ayal I. Sharon
(74) *Attorney, Agent, or Firm* — Armstrong Teasdale LLP

(57) ABSTRACT

An automatic billing and cardholder profile updater (ABCPU) computing device is provided. The ABCPU computing device receives an update request including an account identifier and associated with a candidate payment account over a first network, retrieves billing data associated with the candidate payment account from a billing database that stores billing data associated with a plurality of payment accounts, generates a card profile query including the account identifier, transmits the card profile query over a second network separate from the first network, receives card profile data associated with the candidate payment account from a card profile database that stores card profile data associated with a plurality of payment accounts, generates an update response including the retrieved billing data and the received card profile data, and transmits the update response over the first network to at least one of an acquirer and a merchant associated with the update request.

25 Claims, 6 Drawing Sheets

(56) References Cited

U.S. PATENT DOCUMENTS

| | | | | |
|---|---|---|---|---|
| 7,689,505 B2* | 3/2010 | Kasower | ............... | G07F 7/122 |
| | | | | 705/38 |
| 7,806,323 B2* | 10/2010 | Fomitchev | ............ | G07F 7/1008 |
| | | | | 235/380 |
| 7,818,423 B1* | 10/2010 | Philyaw | ............. | G06Q 20/1085 |
| | | | | 709/225 |
| 7,930,213 B1* | 4/2011 | Philyaw | ............. | G06Q 30/0601 |
| | | | | 705/26.1 |
| 7,970,705 B2* | 6/2011 | Patterson | ............... | G06Q 10/06 |
| | | | | 705/44 |
| 8,341,084 B2* | 12/2012 | Cowen | ................ | G06Q 20/105 |
| | | | | 705/41 |
| 2002/0004770 A1* | 1/2002 | Phillips | ................ | G06Q 20/102 |
| | | | | 705/34 |
| 2003/0033534 A1* | 2/2003 | Rand | .................... | G07F 7/1025 |
| | | | | 713/185 |
| 2005/0149544 A1* | 7/2005 | Bishop | .................. | G06Q 20/00 |
| 2009/0171839 A1* | 7/2009 | Rosano | ................ | G06Q 20/102 |
| | | | | 705/40 |
| 2009/0173783 A1* | 7/2009 | Fomitchev | ............ | G06Q 20/04 |
| | | | | 235/380 |
| 2009/0210344 A1* | 8/2009 | Lange | ................ | G06Q 20/4016 |
| | | | | 705/44 |
| 2009/0305672 A1* | 12/2009 | Bennett | ................ | H04W 12/06 |
| | | | | 455/411 |
| 2010/0153267 A1 | 6/2010 | Ghaidan et al. | | |
| 2010/0174644 A1* | 7/2010 | Rosano | ................ | G06Q 20/102 |
| | | | | 705/40 |
| 2010/0293382 A1* | 11/2010 | Hammad | ............... | H04L 9/3234 |
| | | | | 713/173 |
| 2011/0119155 A1* | 5/2011 | Hammad | ............... | H04L 9/3234 |
| | | | | 705/26.41 |
| 2012/0018506 A1* | 1/2012 | Hammad | ............. | G06Q 30/06 |
| | | | | 235/375 |
| 2012/0018511 A1* | 1/2012 | Hammad | ............. | G06Q 20/385 |
| | | | | 235/380 |
| 2012/0023024 A1* | 1/2012 | Evans | ................ | G06Q 20/352 |
| | | | | 705/66 |
| 2012/0031969 A1* | 2/2012 | Hammad | ............. | G06Q 20/385 |
| | | | | 235/380 |
| 2012/0036052 A1 | 2/2012 | Carroll et al. | | |
| 2012/0166334 A1* | 6/2012 | Kimberg | ............... | G06Q 20/227 |
| | | | | 705/44 |
| 2012/0265683 A1* | 10/2012 | da Silva | ................ | G06Q 20/00 |
| | | | | 705/44 |
| 2012/0296824 A1* | 11/2012 | Rosano | ................ | G06Q 20/102 |
| | | | | 705/44 |
| 2013/0024368 A1* | 1/2013 | Scammell | ............... | G06Q 20/40 |
| | | | | 705/40 |
| 2013/0346302 A1* | 12/2013 | Purves | ................... | G06Q 30/04 |
| | | | | 705/40 |
| 2014/0032409 A1* | 1/2014 | Rosano | ................ | G06Q 20/401 |
| | | | | 705/44 |
| 2014/0201076 A1 | 7/2014 | Pacher et al. | | |
| 2014/0201084 A1* | 7/2014 | Dagenais | ............... | G06Q 20/40 |
| | | | | 705/64 |
| 2014/0214654 A1 | 7/2014 | Greenbaum et al. | | |
| 2014/0258099 A1* | 9/2014 | Rosano | ................ | G06Q 20/409 |
| | | | | 705/39 |
| 2014/0358777 A1* | 12/2014 | Gueh | ................ | G06Q 20/1085 |
| | | | | 705/43 |
| 2014/0365368 A1* | 12/2014 | Rosano | ................ | G06Q 20/354 |
| | | | | 705/44 |
| 2015/0186990 A1 | 7/2015 | Joseph | | |
| 2016/0275463 A1* | 9/2016 | Bhatt | ................... | G06Q 20/405 |
| 2016/0300202 A1* | 10/2016 | Xu | ........................ | G06Q 20/384 |
| 2017/0004506 A1* | 1/2017 | Steinman | ............ | G06Q 20/4014 |
| 2017/0116585 A1* | 4/2017 | Rosano | ................ | G06Q 40/12 |
| 2018/0089648 A1* | 3/2018 | Groarke | ............... | G06Q 20/102 |
| 2018/0197171 A1* | 7/2018 | Steinman | ............. | G06Q 20/385 |
| 2018/0349426 A1* | 12/2018 | Ali | ..................... | G06Q 20/4016 |

OTHER PUBLICATIONS

PCT International Search Report and Written Opinion, Application No. PCT/US2017/049037, dated Oct. 12, 2017, 15 pps.

Dieter Masak: "Moderne Enterprise Architekturen"; In: "Moderne Enterprise Architekturen", Jan. 7, 2005 (Jan. 7, 2005), Springer, XP055406660, ISBN: 978-3-540-22946-9; pp. ToC,Ch04,Ch07-Ch11,Ch15,, Chapters 4 and 9.

\* cited by examiner

MULTI-NETWORK SYSTEMS AND METHODS FOR LINKING STORED ON-FILE DATA WITH PROFILE DATA

BACKGROUND

The field of the present disclosure relates generally to linking stored on-file data with profile data, and more particularly, to multi-networked linking of account-on-file data with card profile data and providing the linked data to merchants with account-on-file customers.

The payment card industry includes payment transactions wherein a payment cardholder makes a purchase, but the physical payment card is not present. These transactions are known as "card-not-present" (CNP) transactions. In such transactions, information regarding the payment card, including an account number and, in many instances, an expiration date for the payment card is transmitted from a merchant, along with an indicator that the transaction is a CNP transaction. An "account-on-file" transaction is a type of transaction in which the merchant stores information regarding the cardholder's payment card in a database, then retrieves the stored payment card information and includes it in at least one authorization request. One specific type of account-on-file transactions is a "recurring payment transaction", which a merchant initiates on a recurring basis for a particular cardholder. In such recurring payment transactions, the merchant stores information regarding the cardholder's payment card in a database, then retrieves the stored payment card information and includes it in each recurring authorization request. In addition to recurring payment transactions, merchants may also maintain account-on-file information to facilitate payment card transactions by repeat customers. For example, an online merchant may allow a shopper to create an online account and store billing data corresponding to one or more methods of payment. When the shopper is ready to check out and complete a purchase, the shopper may simply select one of the stored payment methods as opposed to having to reenter their payment card information.

A downside of storing payment card information, however, is that information regarding a payment card is subject to change. For example a cardholder's payment card might expire, causing a new payment card to be issued with a new expiration date while the card number remains the same. In such instances, an authorization request for a transaction containing the outdated expiration date would be denied by the issuer of the payment card. As a result, the merchant who originally submitted the authorization request is prevented from successfully obtaining payment until the merchant acquires the updated expiration date for the payment card. Due to wide adoption of the account-on-file payment model by merchants and cardholders, it is understandably difficult for a cardholder to update each merchant with new payment card expiration dates. Likewise, it reduces the benefits of the account-on-file payment model to require a merchant to inquire with each cardholder for an updated payment card expiration date prior to submitting each payment authorization request.

In light of the foregoing, known systems may provide merchants with up-to-date cardholder payment card information. To obtain updated billing data in such systems, a merchant generally submits an account query corresponding to one or more payment card accounts to the merchant's acquiring bank (also referred to herein as an "acquirer") which then forwards the query to a billing updater. In response to the query, the billing updater retrieves updated billing data received from the issuer, and transmits the retrieved billing data to the acquiring bank. The acquiring bank then forwards the retrieved billing data to the merchant, which may then update its database of account-on-file payment card information.

However, these known systems are limited in several ways. For example, the billing updaters typically operate separate from other payment systems and payment networks. That is, the queries and billing data used by the billing updaters are not linked to other services that may provide the merchant with additional information associated with the cardholders and the payment accounts stored by the merchants. Accordingly, an enhanced billing updater system having improved interoperability with other payment systems that is configured to provide updated biller information and card profile information is needed.

BRIEF DESCRIPTION

In one aspect, an automatic billing and cardholder profile updater (ABCPU) computing device is provided. The ABCPU computing device includes a processor and a memory in communication with the processor. The processor receives an update request including an account identifier and associated with a candidate payment account over a first network, retrieves billing data associated with the candidate payment account from a billing database that stores billing data associated with a plurality of payment accounts, generates a card profile query including the account identifier, transmits the card profile query over a second network separate from the first network, receives card profile data associated with the candidate payment account from a card profile database that stores card profile data associated with a plurality of payment accounts, generates an update response including the retrieved billing data and the received card profile data, and transmits the update response over the first network to at least one of an acquirer and a merchant associated with the update request.

In another aspect, a method for providing data associated with account-on-file payment accounts to merchants and acquirers is provided. The method is at least partially performed by an ABCPU computing device. The method includes receiving an update request including an account identifier and that is associated with a candidate payment account over a first network, retrieving billing data associated with the candidate payment account from a billing database that stores billing data associated with a plurality of payment accounts, generating a card profile query including the account identifier, transmitting the generated card profile query over a second network separate from the first network, receiving card profile data associated with the candidate payment account from a card profile database that stores card profile data associated with a plurality of payment accounts, generating an update response including the retrieved billing data and the received card profile data, and transmitting the update response over the first network to at least one of an acquirer and a merchant associated with the update request.

In yet another aspect, at least one non-transitory computer-readable storage media having computer-executable instructions embodied thereon is provided. When executed by at least one processor, the computer-executable instructions cause the processor to receive an update request including an account identifier and that is associated with a candidate payment account over a first network, retrieve billing data associated with the candidate payment account from a billing database that stores billing data associated with a plurality of payment accounts, generate a card profile query including the account identifier, transmit the generated card profile query over a second network separate from the first network, receive card profile data associated with the candidate payment account from a card profile database that stores card profile data associated with a plurality of payment accounts, generate an update response including the retrieved billing data and the received card profile data, and transmit the update response over the first network to at least one of an acquirer and a merchant associated with the update request.

BRIEF DESCRIPTION OF THE DRAWINGS

FIG. 1 is a schematic diagram illustrating an example automatic biller and card profile updater (ABCPU) system for linking billing data and card profile data to each other.

FIG. 2 is an example data flow diagram of the system shown in FIG. 1.

FIG. 3 is an expanded block diagram of an example embodiment of a remote device for use in the system shown in FIG. 1.

FIG. 4 illustrates an example configuration of a host system for use in the system shown in FIG. 1.

FIG. 5 is a flowchart of an example process for linking billing data with card profile data using the system shown in FIG. 1.

FIG. 6 is a diagram of components of one or more example computing devices that may be used in embodiments of the described systems and methods.

DETAILED DESCRIPTION

Figure 1:
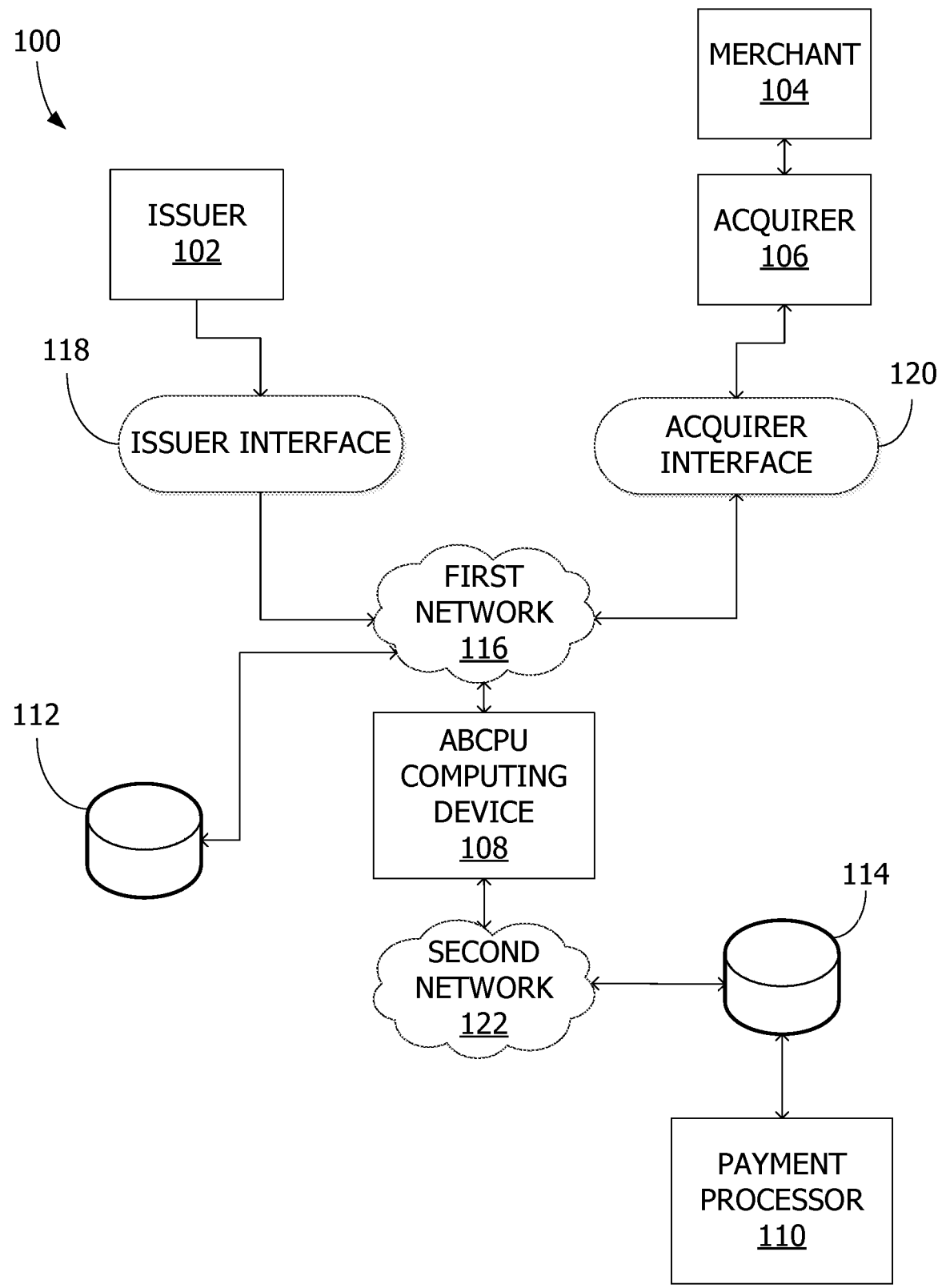
FIGS. 1-6 show example embodiments of the methods and systems described herein.

Systems and method according to this disclosure are directed to an automatic biller and card profile updater (ABCPU) system having an ABCPU computing device for maintaining billing data stored by merchants, and for retrieving additional data associated with cardholders and payment accounts to be provided to acquirers and/or merchants.

The ABCPU computing device is in communication with a plurality of issuers, acquirers, and/or merchants over a first network, and provides an automatic billing updater (ABU) service. More particularly, the ABCPU computing device is configured to provide an ABCPU service. In the example embodiment, the first network is the Internet or some other wide area network (WAN). The issuers communicate with the ABCPU computing device using an issuer interface, while the acquirers and merchants communicate with the ABCPU computing device using an acquirer interface. These interfaces may be web interfaces, such as a web page or API calls.

The ABCPU computing device periodically receives billing data from one or more issuers enrolled in the ABU service through the issuer interface and maintains the billing data in a billing data store, which may be a database. The billing data includes a primary account number (PAN), an expiry date, and/or other information associated with account-on-file transactions. The billing data received from the issuers may include updated billing data that replaces expired billing data for a payment account. If a merchant enrolled in the ABU service wishes to verify billing data for account-on-file transactions, the merchant may, directly or indirectly through an acquirer, submit an update request to the ABCPU computing device. In certain embodiments, multiple update requests from one or more merchants may be collected by an acquirer and submitted to the ABCPU computing device as a batch file.

Each update request may include an account identifier, such as a PAN. In one embodiment, the update request includes an acquirer ID, a merchant ID, a PAN, an expiry date, and discretionary data (e.g., a record identifier for the acquirer). In other embodiments, the update requests additional, fewer, or alternative data elements, including those described elsewhere herein. In response to receiving an update request, the ABCPU computing device may look up or otherwise retrieve billing data in the billing data store corresponding to the account identifier, and generate an update response containing the retrieved data. The retrieved billing data may include the PAN and expiry date stored by the billing data store.

In some embodiments, the ABCPU computing device may only retrieve updated billing data (i.e., billing data the ABCPU computing device has not previously retrieved for the merchant). In one embodiment, the ABCPU computing device or the ABU data store is configured to receive and/or store a record of the billing data currently stored by the merchant. The merchant billing data record is compared to the up-to-date billing data to identify any updated billing data. In some embodiments, each record represents billing data for one payment account in the ABU data store and includes a list of merchants that have previously requested the billing data for the payment account. The record may also indicate the last time an update request associated with a particular merchant occurred. In such embodiments, the ABCPU computing device may be configured to determine whether or not the billing data for a particular payment account has been updated since the previous update request. If the billing data has been updated since the previous update request, the ABCPU computing device identifies the billing data as updated billing data. If billing data for a particular update request has not changed, the ABCPU computing device may indicate the billing data has not changed in the response to the acquirer or merchant. In certain embodiments, the ABCPU computing device may maintain a record for each payment account with historical billing data over a predetermined period of time (e.g., two years).

In the example embodiment, the ABCPU computing device is further configured to offer an additional service (referred to as a "profile service" herein) along with the ABU service. The profile service includes providing the merchants with additional data associated with cardholders and payment accounts for account-on-file transactions. If the ABCPU computing device detects that a merchant associated with a received update request is enrolled in the profile service, the ABCPU computing device transmits a card profile query based on the update request to a card profile data store (e.g., a database) over a second network. The card profile query includes the account identifier to facilitate identifying and retrieving card profile data associated with the update request. The card profile data includes data associated with the payment account that is retrieved, generated, or otherwise collected by a system other than the ABCPU system. The card profile data may include, but is not limited to, fraud history, chargeback history, historical transaction data, customer loyalty profiles, spending behaviors, location information (e.g., delivery address), cardholder information, and so forth.

The second network is separate from the first network. In the example embodiment, the second network is a payment network, and the card profile data store is in communication with a payment processor. The payment network is a closed network (i.e., connection to the payment network requires permission for the administrator of the payment network). The payment network is configured to facilitate generating, receiving, and/or transmitting messages associated with transactions for one or more merchants, issuers, and acquirers in communication with the payment network. In particular, the payment network is configured to facilitate generating, receiving, and/or transmitting messages associated with payment card transactions. These messages may be formatted according to specific protocols associated with the payment network to provide different information and functions. For example, the payment network may be configured to process authorization messages, such as ISO® 8583 compliant messages and ISO® 20022 compliant messages. As used herein, "ISO®" refers to a series of standards approved by the International Organization for Standardization (ISO is a registered trademark of the International Organization for Standardization of Geneva, Switzerland). ISO® 8583 compliant messages are defined by the ISO® 8583 standard which governs financial transaction card originated messages and further defines acceptable message types, data elements, and code values associated with such financial transaction card originated messages. ISO® 8583 compliant messages include a plurality of specified locations for data elements. ISO® 20022 compliant messages are defined by the ISO® 20022 standard. For example, ISO® 20022 compliant messages may include acceptor to issuer card messages (ATICA).

The payment processor receives and/or generates the card profile data and transmits the card profile data to the card profile data store for storage. In one example, the ABCPU computing device transmits the card profile query to the card profile data store. In another example, the ABCPU computing device transmits the card profile query to the payment processor to cause the payment processor to retrieve the card profile data associated with the query. The card profile data store performs a lookup to detect and retrieve stored card profile data associated with the query. In some embodiments, the card profile data store may selectively retrieve card profile data that has been updated since a previous card profile query. The card profile data store generates a profile query response including the retrieved card profile data and transmits the response to the ABCPU computing device.

The ABCPU computing device receives the profile query response and generates an update response that includes the retrieved billing data from the billing data store and the received card profile data. In one embodiment, the ABCPU computing device includes a translator module. The translator module is configured to receive the billing data and the card profile data, parse the data, and generate the update response based on the parsed data. The translator module enables the ABCPU computing device to receive data in a particular format associated with the billing data store or the card profile data store and provide the received data in a unified format. In one example, the update response is generated in a JavaScript Object Notation (JSON) format. If the update response separates the billing data and the card profile data between 'no change' (i.e., the data stored by the merchant has not changed) and 'updated', then the update response may indicate a reason why the billing data and/or card profile data has been updated. For example, if the previous billing data stored by the merchant includes an expired payment card, the updated billing data may indicate a new expiry date for the cardholder's new payment card. The ABCPU computing device then sends the update response to the acquirer or merchant that sent the update request. The merchant updates their stored billing data based on the billing data from the update response. The card profile data may be used by the merchant to facilitate reducing false positive fraud challenges, providing additional benefits to the cardholders associated with the payment accounts, and providing targeted advertising to the cardholders.

By providing both the billing data and the card profile data in a single update response to the merchant, thereby unifying the ABU service and the profile service, the ABCPU computing device facilitates a reduced number of responses transmitted to the merchant in comparison to providing the ABU service and the profile service separately. ABCPU computing device facilitates faster responses, reduced bandwidth consumption, and improved efficiency of computer resources of the ABCPU system by reducing the number of responses transmitted to the merchant. In addition, providing the card profile data at the same time as the billing data to the merchant enables the merchant to take actions associated with the account-on-file transactions based on the card profile data. For example, if the card profile data includes fraud history or compromised account alerts, the merchant can preemptively cancel an account-on-file transaction if the account is compromised. If the merchant received the billing data and card profile data separately, the merchant may not receive the card profile data in time for the account-on-file transaction, and the transaction is processed without knowledge that the account is compromised.

In one example, a merchant receives card profile data for a candidate payment account that has a recurring payment with the merchant. The card profile data includes a fraud history that indicates there has been a recent report of fraud associated with the candidate payment account. Before the next recurring payment is initiated, the merchant may contact a cardholder of the candidate payment account to determine whether or not the candidate payment account has been compromised. If the account has been compromised, the merchant may cancel the recurring payment and request billing data for a different payment account of the cardholder. By preemptively contacting the cardholder, the merchant may avoid chargebacks and interrupting the recurring payments.

In another example, a merchant receives card profile data for a candidate payment account registered for a service provided by the merchant. The card profile data includes historical transaction data and spending behaviors for the candidate payment account. Based on the transaction data and the spending behaviors, the merchant determines that services similar to the service provided by merchant are generally cancelled after six months. The merchant may push a loyalty reward or other incentives to the cardholder of the candidate payment account after five months to attempt to keep the cardholder as a customer.

Although the ABU service and the profile service are described above as parallel, complimentary services, it is to be understood that these services may also be performed separately. For example, a merchant may request updated card profile data every month, but only wants updated billing data from the first network every two months. In such an example, the ABCPU computing device may transmit the profile query response to the acquirer or merchant if the ABU service is not performed.

The methods and systems described herein may be implemented using computer programming or engineering techniques including computer software, firmware, hardware or any combination or subset thereof, wherein the technical effects may be achieved by performing one of the following steps: (i) receiving an update request associated with a candidate payment account over a first network, the update request including an account identifier; (ii) retrieving billing data associated with the candidate payment account from a billing database that stores billing data associated with a plurality of payment accounts; (iii) generating a card profile query including the account identifier; (iv) transmitting the card profile query over a second network separate from the first network; (v) receiving card profile data associated with the candidate payment account from a card profile database that stores card profile data associated with a plurality of payment accounts; (vi) generating an update response including the retrieved billing data and the received card profile data; and (vii) transmitting the update response over the first network to at least one of an acquirer and a merchant associated with the update request.

The systems and methods described herein are configured to facilitate (a) reduced number of responses transmitted to the merchant; (b) preemptively linking data from separate services together prior to the merchant receiving the data; (c) a unified schedule for receiving the data from separate services; and (d) enhanced information associated with account-on-file payment accounts.

Described herein are computer systems such as a payment processor, a user device, and a data mapping computing device. As described herein, all such computer systems include a processor and a memory.

Further, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The systems and processes are not limited to the specific embodiments described herein. In addition, components of each system and each process can be practiced independent and separate from other components and processes described herein. Each component and process also can be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be used as a method of payment for performing a transaction.

The following detailed description illustrates embodiments of the disclosure by way of example and not by way of limitation. It is contemplated that the disclosure has general application to provide cardholder information to account-on-file merchants.

FIG. 1 is a schematic diagram illustrating an example automatic biller and card profile updater (ABCPU) system 100 for linking billing data and card profile data to each other. In the example embodiment, system 100 includes an issuer 102, a merchant 104, an acquirer 106, an ABCPU computing device 108, a payment processor 110, an automatic billing updater (ABU) database 112, and a card profile database 114. In other embodiments, system 100 may include additional, fewer, or alternative subsystems, including those described elsewhere herein. For example, system 100 may include a plurality of issuers 102, merchants 104, and/or acquirers 106.

In the example embodiment, issuer 102 is a bank or other financial institution that provides payment accounts and payment cards to cardholders. Issuer 102 is configured to maintain an up-to-date record of the cardholders' payment accounts to facilitate processing transactions. In one example, among other information, issuer 102 is configured to store a PAN and an expiration or expiry date for each payment card of the cardholders associated with issuer 102. If the cardholder requests a new payment card (e.g., when the expiry date is approaching), issuer 102 updates its records with new payment card information when the payment card is sent to the cardholder. If the new payment card is replacing a previous payment card, the previous payment card may be deactivated to prevent potentially fraudulent transactions with the previous card.

Merchant 104 is an account-on-file merchant. That is, merchant 104 stores payment information for one or more cardholders to facilitate purchases without requiring the cardholder to re-enter payment information if the cardholder is a repeat customer. For example, if the cardholder has purchased a subscription-based service or product through merchant 104, merchant 104 may automatically bill the cardholder at the end of a recurring time period (e.g., one month). In another example, a cardholder may have an account registered with merchant 104. Merchant 104 may store payment information for the cardholder with the account to enable the cardholder to simply select the stored payment information to complete a purchase. In at least some embodiments, the account-on-file transactions with merchant 104 are card-not-present (CNP) transactions. In the example embodiment, for account-on-file payment accounts, merchant 104 stores records including at least a current PAN, expiry date, and user identifier associated with each payment account. The user identifier may be, for example, an identifier that identifies the cardholder or account associated with the stored record, such as a username.

Acquirer 106 is associated with merchant 104. In particular, acquirer 106 is a bank or other financial institution that maintains a payment account of merchant 104. Acquirer 106 is configured to perform at least some payment actions on-behalf-of merchant 104, such as communicate with issuer 102 to settle payments.

ABCPU computing device 108 is in communication with issuer 102, merchant 104, and acquirer 106 over a first network 116. In one embodiment, first network 116 is the Internet. In the example embodiment, issuer 102 communicates with ABCPU computing device 108 through an issuer interface 118. Merchant 104 and acquirer 106 communicate with ABCPU computing device 108 through an acquirer interface 120. Although it is shown that merchant 104 communicates through acquirer 106, it is to be understood that merchant 104 may access interface 120 directly. Interfaces 118, 120 may be, but are not limited to, web interfaces, command line interfaces, messaging interfaces, and the like.

ABCPU computing device 108 is further in communication with card profile database 114 over a second network 122. Second network 122 is separate from first network 116. In one example, second network 122 is a payment network. Alternatively, ABCPU computing device 108 is in communication with issuer 102, merchant 104, and acquirer 106 over a first communication channel and card profile database 114 over a second, separate communication channel. The first and second communication channels may be part of the same network.

In the example embodiment, card profile database 114 is configured to store card profile data (not shown in FIG. 1). The card profile data includes information associated with payment accounts and/or cardholders of the payment accounts. For example, card profile data may include, but is not limited to, historical transaction data, shopping behaviors, reported fraudulent activity, chargeback history, and/or other transaction-based profiles associated with a cardholder and a payment account of the cardholder. Although card profile database 114 is shown as single database, it is to be understood that database 114 may be a plurality of databases in communication with ABCPU computing device 108 over second network 122. Each database may profile a particular data element of the card profile data (e.g., shopping behaviors in one database and fraud history in another). In the example embodiment, the card profile data is generated and/or collected by payment processor 110.

Payment processor 110 is configured to process transactions within a payment network. That is, payment processor 110 is configured to receive, process, and/or transmit transaction data, authorization messages (e.g., ISO® 8583 compliant messages and ISO® 20022 compliant messages), and other transaction-related messages within the payment network. The payment network is configured to facilitate processing transactions (e.g., payment card transactions) by providing particular message protocols to merchants, issuers, acquirers, and payment processor 110 to perform particular functions within the payment network. In the example embodiment, the payment network is a closed network. That is, the payment network is configured to prevent unpermitted access to the messages within the payment network.

The data received, processed, and/or transmitted by payment processor 110 may be used to generate card profile data. In some embodiments, the data is directly included within the card profile data. Payment processor 110 is in communication with card profile database 114 to transmit the card profile data for storage. Additionally or alternatively, one or more different computing devices associated with transaction data are communicatively coupled to card profile database 114 to provide at least a portion of the card profile data.

Figure 2:
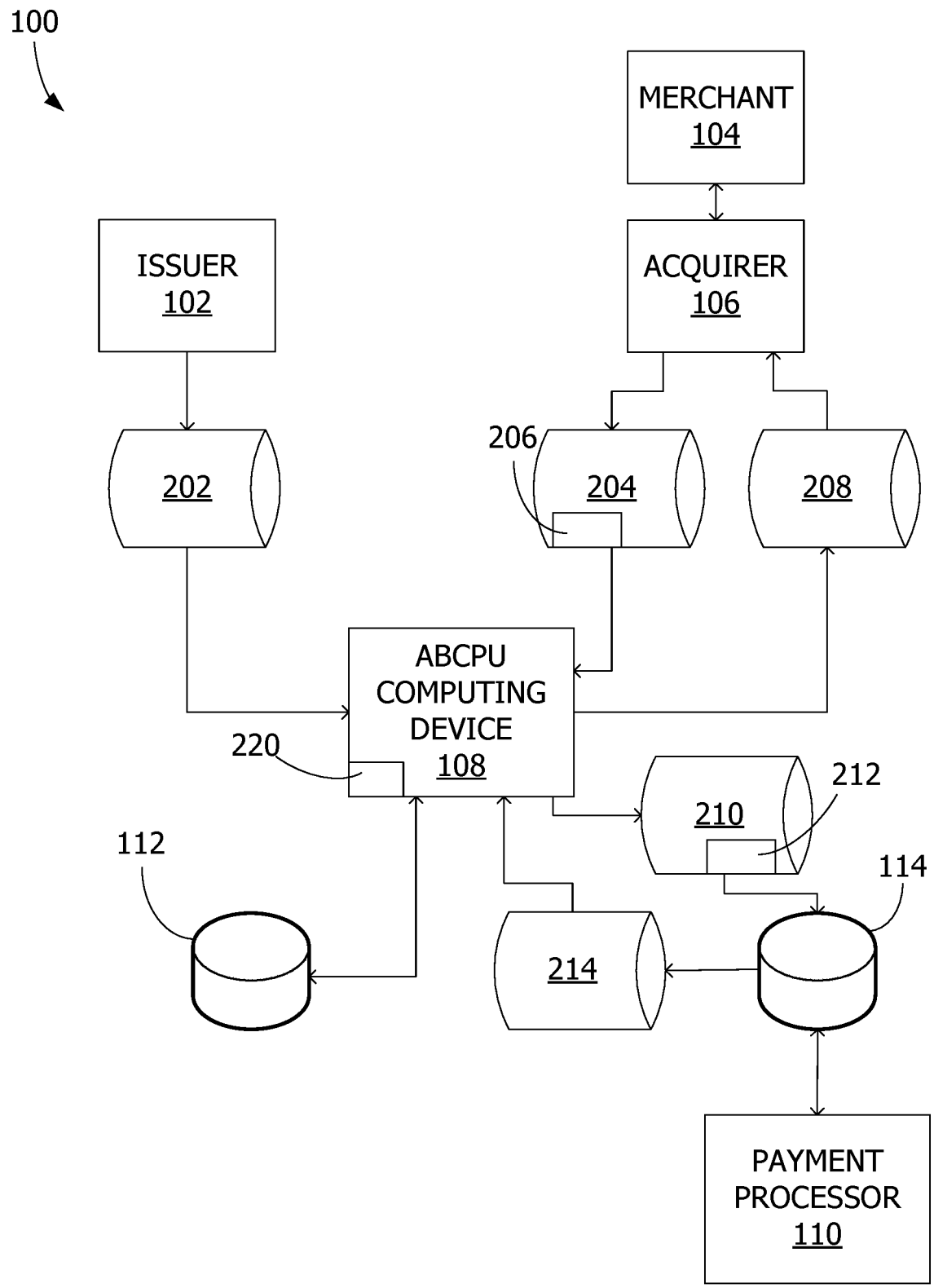

FIG. 2 is an example data flow diagram of system 100 (shown in FIG. 1). In particular, FIG. 2 depicts data flow between issuer 102, merchant 104, acquirer 106, ABCPU computing device 108, payment processor 110, ABU database 112, and card profile database 114. In other embodiments, system 100 may provide additional, fewer, or alternative data, including those described elsewhere herein.

With reference to FIGS. 1 and 2, in the example embodiment, ABCPU computing device 108 periodically receives billing data 202 from issuer 102 through issuer interface 116. Billing data 202 is stored by ABCPU computing device 108 in ABU database 112. Billing data 202 includes, but is not limited to, a PAN, an expiry date, and/or other information associated with account-on-file transactions. Billing data 202 may include updated billing data, such as updated billing data to replace billing data associated with an expired payment card, and/or new billing data for new account-on-file transactions. In one embodiment, billing data 202 is stored in one or more tables within ABU database 112 that are configured to store billing data. If merchant 104 is enrolled in an ABU service provided by ABCPU computing device 108 and wants to verify billing data of one or more customers registered for account-on-file transactions, merchant 104 may, directly or indirectly through acquirer 106, submit an update request 204 to ABCPU computing device 108. Update request 204 is configured to identify a cardholder and payment account that is registered for account-on-file transactions with merchant 104. In certain embodiments, multiple update requests 204 from merchant 104 and/or other merchants may be collected by acquirer 106 and submitted to ABCPU computing device 108 as a batch request.

Each update request 204 includes an account identifier 206, such as a PAN. In some embodiments, each update request 204 also includes an expiry date to enable ABCPU computing device 108 to identify updated billing data 202 as described herein. In response to receiving update request 204, ABCPU computing device 108 looks up or otherwise retrieves billing data 202 in ABU database 112 corresponding to account identifier 206 and generates an update response 208 containing the retrieved billing data 202. The retrieved billing data 202 includes at least the PAN and expiry date stored in ABU database 112. In one embodiment, billing data 202 is retrieved in a format associated with ABU database 112. In some embodiments, ABCPU computing device 108 may only retrieve updated billing data 202 (i.e., billing data ABCPU computing device 108 has not previously retrieved for merchant 104). In such embodiments, if billing data 202 for a particular update request 204 has not changed, ABCPU computing device 108 indicates billing data 202 has not changed in update response 208. In one example, ABCPU computing device 108 compares the billing data from update request 204 (i.e., account identifier 206 and an expiry date) to billing data 202 of a corresponding record in ABU database 112. If the billing data of update request 204 does not match, billing data 202 within ABU database 112 is determined to be updated. Alternatively, ABCPU computing device 108 and/or ABU database 112 may maintain a record or log (not shown) that indicates when each record of billing data 202 was updated by issuer 102 and the last time update request 204 was sent by merchant 104. If billing data 202 was updated after the last update request from merchant 104, ABCPU computing device 108 identifies billing data 202 as updated.

In certain embodiments, if billing data 202 has been updated, ABCPU computing device 108 maintains a record of historical billing data over a predetermined period of time (e.g., two years) for each payment account stored in ABU database 112. By storing historical billing data, ABCPU computing device 108 is configured to identify up-to-date billing data 202 that corresponds to update requests 204 that include out-of-date information.

In the example embodiment, ABCPU computing device 108 is further configured to offer an ABCPU service to provide updated billing data 202 and additional data associated with the cardholders of the payment accounts of billing data 202 to merchant 104 and acquirer 106. In at least some embodiments, the additional data is associated with a service provided by a payment network that is separate from the ABU service. When merchant 104 and/or acquirer 106 registers for the ABCPU service, ABCPU computing device 108 stores a record for merchant 104 and/or acquirer 106 in a memory (not shown in FIGS. 1 and 2). When ABCPU computing device 108 receives update request 204, ABCPU computing device 108 performs a lookup of merchant 104 and/or acquirer 106. In other embodiments, acquirer interface 120 has separate communication channels for the ABU and ABCPU services such that ABCPU computing device 108 is configured to detect which communication channel is used to transmit update request 204 and automatically identify which service merchant 104 is registered for based on the detected communication channel. An ABCPU process is initiated if ABCPU computing device 108 identifies merchant 104 and/or acquirer 106 as registered for the ABCPU service.

During the ABCPU process, ABCPU computing device 108 retrieves billing data 202 stored in ABU database 112 that is associated with update request 204. Additionally, ABCPU computing device 108 is configured to generate a card profile query 210 that includes account identifier 206 and transmit query 210 to card profile database 114. Query 210 is configured to request card profile data 214 associated with account identifier 206 from card profile database 114. ABCPU computing device 108 is configured to format query 210 according to a searchable format for card profile database 114. In certain embodiments, when card profile database 114 includes a plurality of databases, ABCPU computing device 108 is configured to generate formatted queries 210 for one or more of the databases. In at least some embodiments, query 210 is generated and transmitted substantially simultaneously while ABCPU computing device 108 retrieving billing data 202 from ABU database 112. In other embodiments, query 210 is generated and transmitted before or after billing data 202 is retrieved. For example, ABCPU computing device 108 may replace account identifier 206 in query 210 with an updated account identifier from billing data 202 if billing data 202 has been updated.

In the example embodiment, payment processor 110 is configured to receive, process, and/or transmit transaction data and other data (not shown) associated with one or more transactions within a payment network. Payment processor 110 is further configured to retrieve, generate, and/or otherwise determine card profile data 214 from the payment network. Card profile data 214 is stored within card profile database 114 by payment processor 110 for retrieval during the ABCPU process. Additionally or alternatively, at least a portion of card profile data 214 may be received from a different computing device. In one embodiment, card profile data 214 is stored in one or more tables within card profile database 114 that are configured to store specific types of card profile data 214. For example, card profile database 114 may include a first table for fraud history data and a second table for shopping behaviors.

Card profile database 114 is configured to receive query 210 and identify stored card profile data 214 that corresponds to the payment accounts and cardholders identified by query 210. In one example, card profile database 114 uses account identifier 206 or another account identifier within query 210 to perform a lookup of the stored card profile data. In some embodiments, query 210 may cause database 114 and/or payment processor 110 to retrieve and/or generate additional card profile data 214. Once the relevant card profile data 214 is identified, card profile database 114 is configured to generate a profile query response with the identified card profile data 214 and transmit the response to ABCPU computing device 108. In at least one embodiment, the profile query response and the retrieved billing data 202 are provided in different formats to ABCPU computing device 108. In other embodiments, the profile query response and the retrieved billing data 202 are provided in substantially similar formats.

ABCPU computing device 108 is configured to generate update response 208 based on billing data 202 and card profile data 214 received from ABU database 112 and card profile database 114, respectively. In the example embodiment, ABCPU computing device 108 includes a translator module 220 that is configured to receive billing data 202 and card profile data 214. Translator module 220 is configured to enable billing data 202 and card profile data 214 to be unified into a single formatted response (i.e., update response 208) rather than forcing merchant 104 to separately parse billing data 202 and card profile data 214. In particular, translator module 220 is configured to parse billing data 202 and the profile query response with card profile data 214 into a plurality of data elements. Translator module 220 may also be configured to compare similar data elements from billing data 202 and card profile data 214 to verify that both sets of data are associated with the same cardholder and/or to identify out-of-date information. Once the data is parsed, translator module 220 is configured to generate update response 208 using the parsed data. In one example, update response 208 is generated in a JSON format. ABCPU computing device 108 is configured to transmit update response 208 to merchant 104 and/or acquirer 106 through acquirer interface 120. By providing a unified update response 208, ABCPU computing device 108 facilitates a reduced number of queries by merchant 104 to each database 112, 114 in addition to synchronizing data between two separate services to provide merchant 104 with enhanced information associated with account-on-file payment accounts.

In some embodiments, prior to transmitting update response 208, ABCPU computing device 108 may be configured to receive one or more settings from issuer 102 and/or a cardholder (not shown) to facilitate selective transmittal of billing data 202 and/or card profile data 214 with update response 208. In particular, ABCPU computing device 108 may be configured to receive settings from issuer 102 to prevent particular merchants from receiving billing data 202. In one example, issuer 102 blacklists a particular merchant that has been identified as compromised to prevent fraudulent activity with the updated billing data 202. In some embodiments, the cardholder may be provided an interface with ABCPU computing device 108 that enables the cardholder to customize what card profile data 214 is provided to the merchants in addition to which merchants are permitted to receive card profile data 214. In one embodiment, translator module 220 is configured to selectively prevent at portion of update response 208 from being generated based at least in part on the settings provided by issuer 102 and/or the cardholder.

Figure 3:
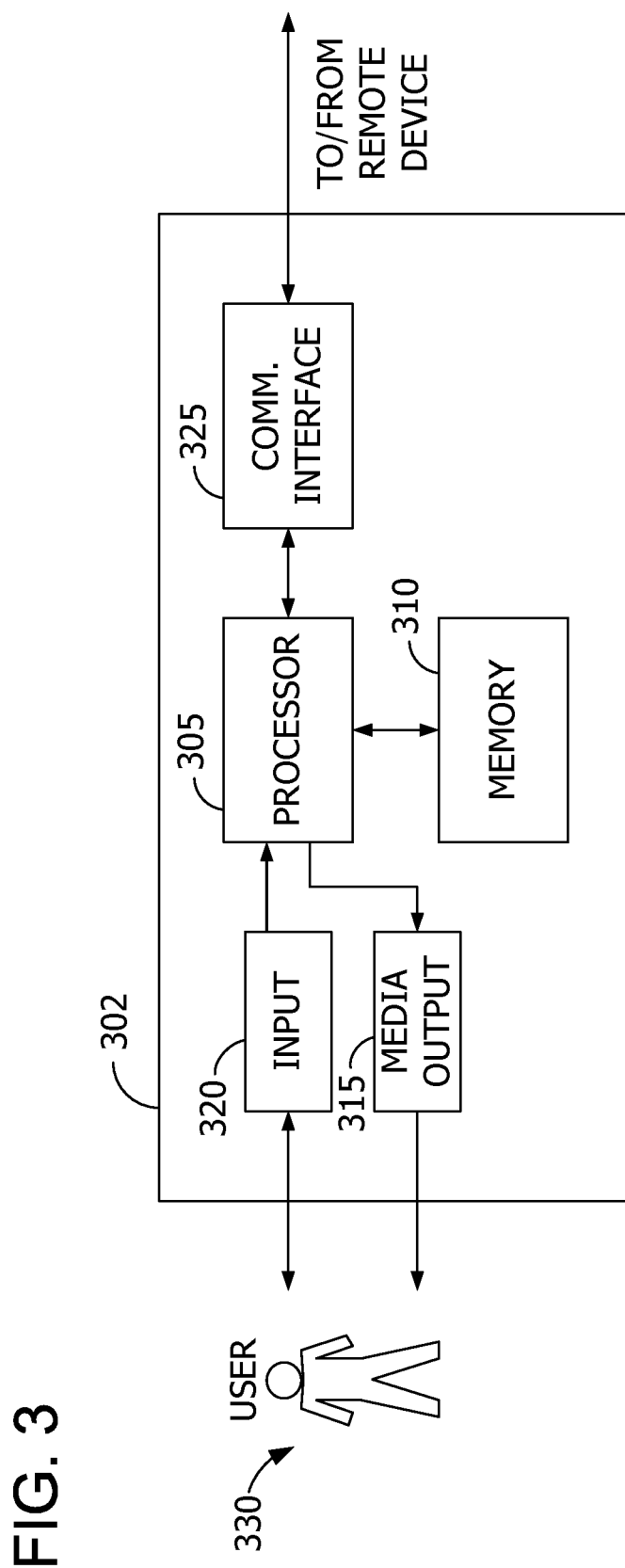

FIG. 3 depicts an exemplary configuration of a remote or user computing device 302, such as devices associated with issuer 102, merchant 104, and/or acquirer 106 (shown in FIG. 1). Computing device 302 may include a processor 305 for executing instructions. In some embodiments, executable instructions may be stored in a memory area 310. Processor 305 may include one or more processing units (e.g., in a multi-core configuration). Memory area 310 may be any device allowing information such as executable instructions and/or other data to be stored and retrieved. Memory area 310 may include one or more computer-readable media.

Computing device 302 may also include at least one media output component 315 for presenting information to a user 330. Media output component 315 may be any component capable of conveying information to user 330. In some embodiments, media output component 315 may include an output adapter, such as a video adapter and/or an audio adapter. An output adapter may be operatively coupled to processor 305 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 315 may be configured to present an interactive user interface (e.g., a web browser or client application) to user 330.

In some embodiments, computing device 302 may include an input device 320 for receiving input from user 330. Input device 320 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 315 and input device 320.

Computing device 302 may also include a communication interface 325, which may be communicatively coupleable to a remote device. Communication interface 325 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 310 are, for example, computer-readable instructions for providing a user interface to user 330 via media output component 315 and, optionally, receiving and processing input from input device 320. A user interface may include, among other possibilities, a web browser and client application. Web browsers enable users 330 to display and interact with media and other information typically embedded on a web page or a website from a web server associated with a merchant. A client application allows users 330 to interact with a server application associated with, for example, a vendor or business.

Figure 4:
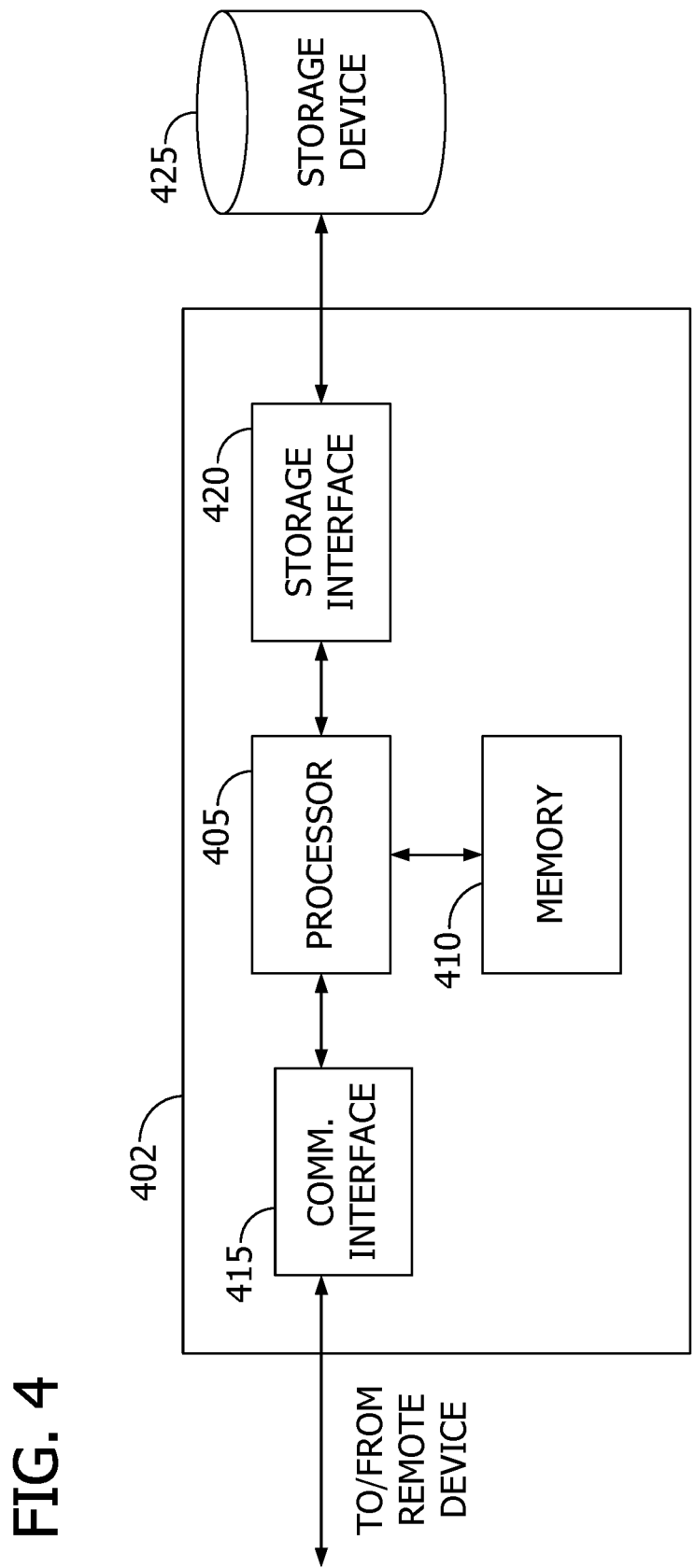

FIG. 4 depicts an exemplary configuration of a host computing device 402, such as ABCPU computing device 108 and payment processor 110 (shown in FIG. 1). Host computing device 402 may include a processor 405 for executing instructions. Instructions may be stored in a memory area 410, for example. Processor 405 may include one or more processing units (e.g., in a multi-core configuration).

Processor 405 may be operatively coupled to a communication interface 415 such that host computing device 402 may be capable of communicating with a remote device such as computing device 302 shown in FIG. 3 or another host computing device 402. For example, communication interface 415 may receive requests from user computing device 302 via the Internet.

Processor 405 may also be operatively coupled to a storage device 425. Storage device 425 may be any computer-operated hardware suitable for storing and/or retrieving data. In some embodiments, storage device 425 may be integrated in host computing device 402. For example, host computing device 402 may include one or more hard disk drives as storage device 425. In other embodiments, storage device 425 may be external to host computing device 402 and may be accessed by a plurality of host computing devices 402. For example, storage device 425 may include multiple storage units such as hard disks or solid state disks in a redundant array of inexpensive disks (RAID) configuration. Storage device 425 may include a storage area network (SAN) and/or a network attached storage (NAS) system.

In some embodiments, processor 405 may be operatively coupled to storage device 425 via a storage interface 420. Storage interface 420 may be any component capable of providing processor 405 with access to storage device 425. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 425.

Memory areas 310 (shown in FIG. 3) and 410 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 5:
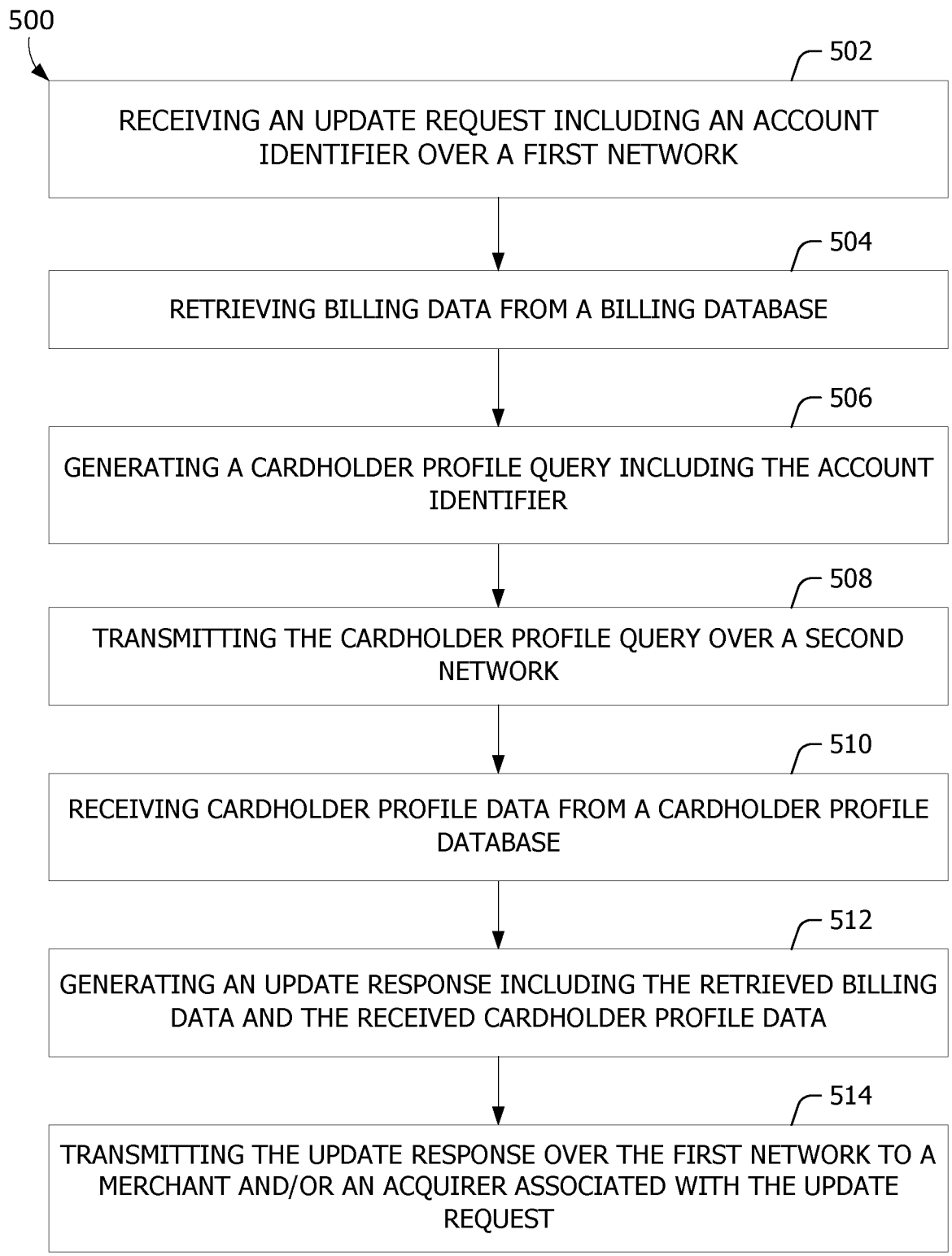

FIG. 5 is a flow diagram of an example method 600 for linking billing data to card profile data and transmitting the data to a merchant using an ABCPU system, such as system 100 (shown in FIG. 1). In the example embodiment, method 500 is performed by an ABCPU computing device. In certain embodiments, method 500 may be at least partially performed by a different computing device. In other embodiments, method 500 may include additional, fewer, or alternative actions, including those described elsewhere herein.

Method 500 begins with the ABCPU computing device receiving 502 an update request over a first network from a merchant or acquirer. The update request includes an account identifier that is associated with a candidate payment account. In some embodiments, the ABCPU computing device receives 502 a plurality of update requests for a plurality of payment accounts as a batch request from the merchant or acquirer. In some embodiments, the ABCPU computing device determines whether or not the merchant or acquirer is registered for an ABCPU service. The ABCPU computing device retrieves 504 billing data associated with the candidate payment account from a billing database (e.g., ABU database 112, shown in FIG. 1) that stores billing data for a plurality of payment accounts. The billing data stored within billing database is from one or more issuers, and therefore the stored billing data is assumed to be up-to-date. In some embodiments, the ABCPU computing device only retrieves 504 updated billing data associated with the update request.

In the example embodiment, the ABCPU computing device generates 506 a card profile query that includes the account identifier. The query is transmitted 508 to a card profile database over a second network separate from the first network to collect card profile data associated with the update request. The card profile database receives the query and performs a lookup to identify relevant stored card profile data that was provided by a payment processor or another computing device. The card profile data identified by the card profile database is transmitted to the ABCPU computing device as part of a query response. The ABCPU computing device receives 510 the card profile data from the card profile database. In the example embodiment, the ABCPU computing device generates 512 an update response that includes the retrieved billing data and the received card profile data associated with the update request, thereby linking the billing data and card profile data together. The ABCPU computing device then transmits 514 the update response over the first network to the merchant and/or acquirer associated with the update request to facilitate updating the merchant's account-on-file transaction records and providing additional information about the cardholder's of the account-on-file payment accounts.

Figure 6:
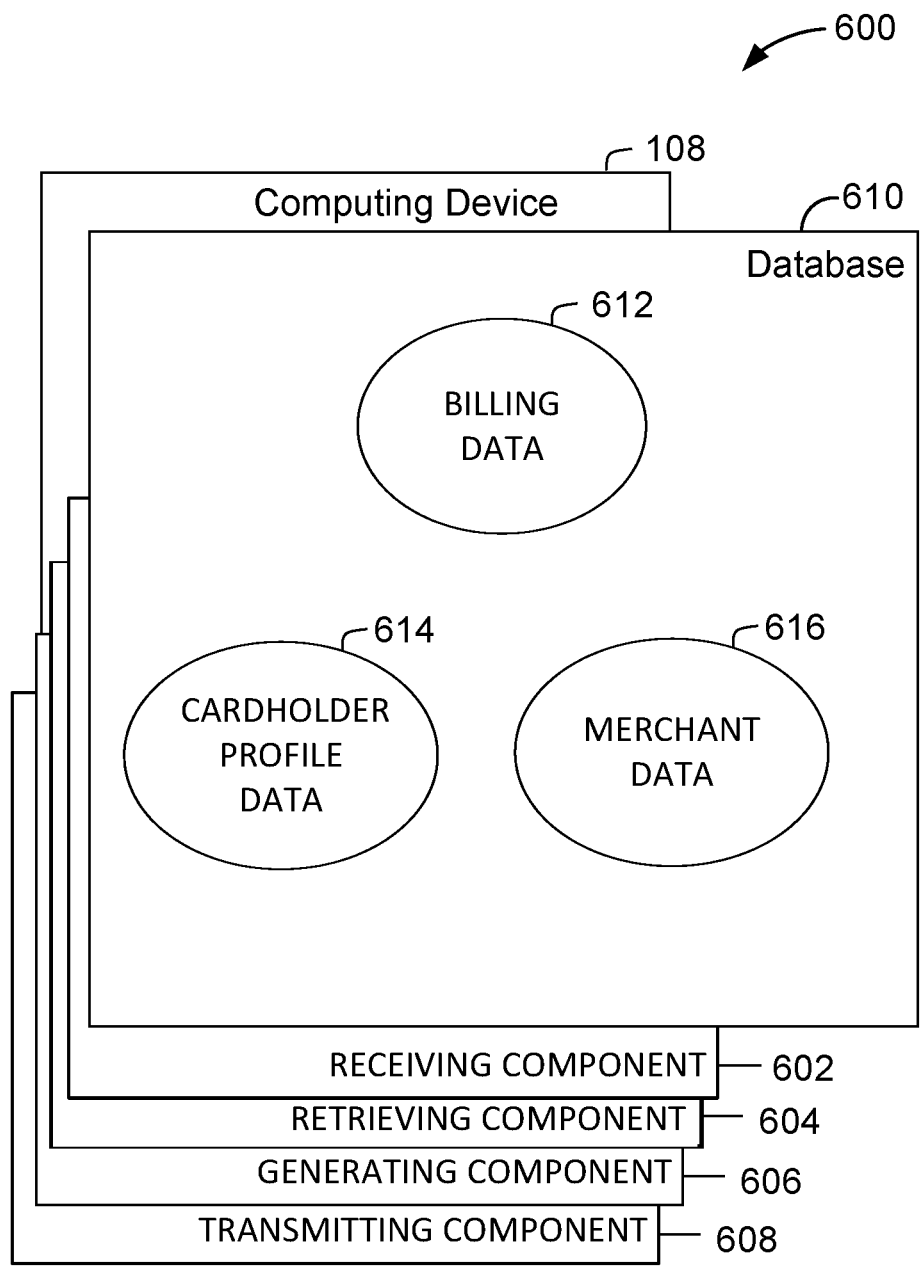

FIG. 6 is a diagram 600 of components of one or more example computing devices that may be used in the method shown in FIG. 5. FIG. 6 further shows a configuration of a database system 610 including at least ABU database 112 and card profile database 114 (shown in FIG. 1). Database system 610 is coupled to several separate components within ABCPU computing device 108 (shown in FIG. 1), which perform specific tasks.

ABCPU computing device 108 includes a receiving component 602 configured to receive an update request associated with a candidate payment account over a first network. Receiving component 602 is further configured to receive card profile data associated with the candidate payment account from a card profile database. ABCPU computing device 108 further includes a retrieving component 604 configured to retrieve billing data associated with the candidate payment account from a billing database. ABCPU computing device 108 also includes a generating component 606 configured to generate a card profile query including an account identifier of the update request. Generating component 606 is further configured to generate an update response including the retrieved billing data and the received card profile data. ABCPU computing device 108 further includes a transmitting component 608 configured to transmit the card profile query over a second network separate from the first network. Transmitting component 608 is further configured to transmit the update response over the first network to at least one of an acquirer and a merchant associated with the update request.

In an exemplary embodiment database system 610 is divided into a plurality of sections, including but not limited to, a billing data section 612, a card profile data section 614, and a merchant data section 616. Merchant data section 616 may include, for example, a list of registered merchants for the ABCPU service and/or the settings provided by issuers or cardholders to provide selective access to the update response. These sections are separated between databases 112, 114 (e.g., billing data section 112 is stored in ABU database 112). Databases 112, 114 are interconnected through ABCPU computing device 108 to update and retrieve the information as required.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An automatic billing and cardholder profile updater (ABCPU) computing device comprising a processor and a memory in communication with the processor, the ABCPU computing device in communication with (i) a plurality of issuers of a plurality of payment accounts, (ii) a plurality of merchants, (iii) a plurality of acquirers, and (iv) a billing database over a first network, wherein the first network is the Internet, and wherein the billing database receives current billing data associated with the plurality of payment accounts from the plurality of issuers of the plurality of payment accounts and stores the current billing data based on account identifiers of the plurality of payment accounts, and the ABCPU computing device further in communication with a card profile database over a second network, wherein the second network is a closed payment processing network, wherein the card profile database is populated by a payment processor of the payment processing network with the card profile data and stores respective card profile data associated with the plurality of payment accounts and collected by the payment processor from messages transmitted over the second network in connection with historical transactions for each respective payment account, wherein the card profile data is indexed according to a respective account identifier, and wherein the card profile database is inaccessible to the plurality of merchants over the second network, wherein the processor is programmed to:

receive, over the first network, an update request associated with a candidate payment account registered for account-on-file payment transactions, wherein the update request includes an account identifier of the candidate payment account;

access, over the first network, the billing database to retrieve current billing data associated with the candidate payment account, wherein the current billing data includes at least one of an updated primary account number (PAN) and an updated expiry date associated with the candidate payment account, and wherein the retrieved current billing data is formatted in a first format associated with web-based API calls;

generate a card profile query configured to request and retrieve the card profile data associated with the candidate payment account from the card profile database, wherein the card profile query includes the account identifier of the candidate payment account, and wherein the received card profile data is formatted in a second format according to specific protocols associated with the payment processing network;

transmit the generated card profile query over the second network to the card profile database;

receive, in response to the card profile query, the card profile data associated with the candidate payment account, from the card profile database over the second network;

re-format the card profile data into the first format;

combine the received updated billing data and the retrieved card profile data into a single message to generate an enhanced update response including the retrieved current billing data and received card profile data in the first format; and transmit the enhanced update response, over the first network, to at least one of an acquirer of the plurality of acquirers and a merchant of the plurality of merchants associated with the update request, wherein the updated billing data of the transmitted enhanced update response enables the merchant to update locally stored billing data for the candidate account with the updated billing data for use in processing future account-on-file transactions, and wherein the card profile data of the transmitted enhanced update response enables the merchant to provide additional value added services to a cardholder of the candidate account.

2. The ABCPU computing device in accordance with claim 1, wherein the card profile data includes at least one of fraud history, a loyalty customer profile, a chargeback history, historical transaction data, a customer loyalty profile, a spending behavior, location information, and cardholder information associated with the candidate payment account.

3. The ABCPU computing device in accordance with claim 1, wherein the processor is further programmed to:
compare the current billing data associated with the candidate payment account retrieved from the billing database to a merchant billing data record associated with previous update requests; and
determine whether the current billing data for the candidate payment account has been updated since the previous update requests.

4. The ABCPU computing device in accordance with claim 1, wherein the processor is further configured to include at least a portion of the retrieved current billing data in the generated card profile query, before transmitting the card profile query to the card profile database.

5. The ABCPU computing device in accordance with claim 1, wherein the processor is further programmed to transmit the card profile query to the payment processor, to cause the payment processor to (i) retrieve the card profile data associated with the candidate payment account, from the card profile database and (ii) transmit the retrieved card profile data to the ABCPU computing device.

6. The ABCPU computing device in accordance with claim 1, wherein the processor is further programmed to:
detect whether at least one of the merchant and the acquirer associated with the update request is registered for an ABCPU service; and
generate the card profile query in response to the detection.

7. The ABCPU computing device in accordance with claim 6, wherein the processor is further programmed to detect whether at least one of the merchant and the acquirer associated with the update request is registered for the ABCPU service, by performing a lookup of a list of registered users of the ABCPU service stored in the memory.

8. The ABCPU computing device in accordance with claim 6, wherein the processor is further programmed to detect whether at least one of the merchant and the acquirer associated with the update request is registered for the ABCPU service, by determining whether the update request was received over a communication channel associated with the ABCPU service.

9. The ABCPU computing device in accordance with claim 1, wherein the enhanced update response includes the card profile data including at least one of fraud history and compromised account alerts for the candidate payment account, and wherein the additional value added services provided include fraud prevention techniques, and wherein the processor is further programmed to transmit the enhanced update response to the merchant associated with the update request before the merchant submits a subsequent account-on-file payment transaction associated with the candidate payment account to cause the merchant to determine whether to preemptively cancel the subsequent account-on-file payment transaction based on the card profile data included in the enhanced update response and the fraud prevention techniques.

10. A method for providing data associated with account-on-file payment accounts to merchants and acquirers, said method implemented by an automatic billing and cardholder profile updater (ABCPU) computing device comprising a processor and a memory in communication with the processor, the ABCPU computing device in communication with (i) a plurality of issuers of a plurality of payment accounts, (ii) a plurality of merchants, (iii) a plurality of acquirers, and (iv) a billing database over a first network, wherein the first network is the Internet, and wherein the billing database receives current billing data associated with the plurality of payment accounts from the plurality of issuers of the plurality of payment accounts and stores the current billing data based on account identifiers of the plurality of payment accounts, and the ABCPU computing device further in communication with a card profile database over a second network, wherein the second network is a closed payment processing network, wherein the card profile database is populated by a payment processor of the payment processing network with the card profile data and stores respective card profile data associated with the plurality of payment accounts and collected by the payment processor from messages transmitted over the second network in connection with historical transactions for each respective payment account, wherein the card profile data is indexed according to a respective account identifier, and wherein the card profile database is inaccessible to the plurality of merchants over the second network, wherein said method comprises:

receiving, over the first network, by an automatic billing and cardholder profile updater (ABCPU) computing device, an update request associated with a candidate payment account registered for account-on-file payment transactions, wherein the update request includes an account identifier of the candidate payment account;

accessing, over the first network, the billing database to retrieve current billing data associated with the candidate payment account, wherein the current billing data includes at least one of an updated primary account number (PAN) and an updated expiry date associated with the candidate payment account, and wherein the retrieved current billing data is formatted in a first format associated with web-based API calls;

generating, by the ABCPU computing device, a card profile query configured to request and retrieve the card profile data associated with the candidate payment account from the card profile database, wherein the card profile query includes the account identifier of the candidate payment account, and wherein the received card profile data is formatted in a second format according to specific protocols associated with the payment processing network;

transmitting the generated card profile query over the second network to the card profile database;

receiving, in response to the card profile query, the card profile data associated with the candidate payment account, from the card profile database over the second network;

re-format the card profile data into the first format;

combining the received updated billing data and the retrieved card profile data into a single message to generate an enhanced update response including the retrieved current billing data and received card profile data in the first format; and transmitting the enhanced update response, over the first network, to at least one of an acquirer of the plurality of acquirers and a merchant of the plurality of merchants associated with the update request, wherein the updated billing data of the transmitted enhanced update response enables the merchant to update locally stored billing data for the candidate account with the updated billing data for use in processing future account-on-file transactions, and wherein the card profile data of the transmitted enhanced update response enables the merchant to provide additional value added services to a cardholder of the candidate account.

11. The method in accordance with claim 10, wherein the card profile data includes at least one of fraud history, a loyalty customer profile, a chargeback history, historical transaction data, a customer loyalty profile, a spending behavior, location information, and cardholder information associated with the candidate payment account.

12. The method in accordance with claim 10, wherein retrieving the current billing data further comprises:

comparing the current billing data associated with the candidate payment account retrieved from the billing database to a merchant billing data record associated with previous update requests; and determining whether the current billing data for the candidate payment account has been updated since the previous update requests.

13. The method in accordance with claim 10, wherein generating the card profile query further comprising adding at least a portion of the retrieved current billing data to the generated card profile query, before transmitting the card profile query to the card profile database.

14. The method in accordance with claim 10, transmitting the card profile query further comprises transmitting the card profile query to the payment processor, to cause the payment processor to (i) retrieve the card profile data associated with the candidate payment account, from the card profile database and (ii) transmit the retrieved card profile data to the ABCPU computing device.

15. The method in accordance with claim 10, wherein generating the card profile query further comprises:

detecting, by the ABCPU computing device, whether at least one of the merchant and the acquirer associated with the update request is registered for an ABCPU service; and generating the card profile query in response to the detection.

16. The method in accordance with claim 15, wherein detecting whether at least one of the merchant and the acquirer associated with the update request is registered for the ABCPU service further comprises performing a lookup of a list of registered users of the ABCPU service stored in a memory associated with the ABCPU computing device.

17. The method in accordance with claim 15, wherein detecting whether at least one of the merchant and the acquirer associated with the update request is registered for the ABCPU service further comprises determining, by the ABCPU computing device, whether the update request was received over a communication channel associated with the ABCPU service.

18. At least one non-transitory computer-readable storage media having computer-executable instructions embodied thereon, wherein when executed by at least one processor of an automatic billing and cardholder profile updater (ABCPU) computing device, the ABCPU computing device in communication with (i) a plurality of issuers of a plurality of payment accounts, (ii) a plurality of merchants, (iii) a plurality of acquirers, and (iv) a billing database over a first network, wherein the first network is the Internet, and wherein the billing database receives current billing data associated with the plurality of payment accounts from the plurality of issuers of the plurality of payment accounts and stores the current billing data based on account identifiers of the plurality of payment accounts, and the ABCPU computing device further in communication with a card profile database over a second network, wherein the second network is a closed payment processing network, wherein the card profile database is populated by a payment processor of the payment processing network with the card profile data and stores respective card profile data associated with the plurality of payment accounts and collected by the payment processor from messages transmitted over the second network in connection with historical transactions for each respective payment account, wherein the card profile data is indexed according to a respective account identifier, and wherein the card profile database is inaccessible to the plurality of merchants over the second network, the computer-executable instructions cause the processor to:

receive, over the first network, an update request associated with a candidate payment account registered for account-on-file payment transactions, wherein the update request includes an account identifier of the candidate payment account;

access, over the first network, the billing database to retrieve current billing data associated with the candidate payment account, wherein the current billing data includes at least one of an updated primary account number (PAN) and an updated expiry date associated with the candidate payment account, and wherein the retrieved current billing data is formatted in a first format associated with web-based API calls;

generate a card profile query configured to request and retrieve the card profile data associated with the candidate payment account from the card profile database, wherein the card profile query includes the account identifier of the candidate payment account, and wherein the received card profile data is formatted in a second format according to specific protocols associated with the payment processing network;

transmit the generated card profile query over the second network to the card profile database;

receive, in response to the card profile query, the card profile data associated with the candidate payment account, from the card profile database over the second network;

re-format the card profile data into the first format;

combine the received updated billing data and the retrieved card profile data into a single message to generate an enhanced update response including the retrieved current billing data and received card profile data in the first format; and transmit the enhanced update response, over the first network, to at least one of an acquirer of the plurality of acquirers and a merchant of the plurality of merchants associated with the update request, wherein the updated billing data of the transmitted enhanced update response enables the merchant to update locally stored billing data for the candidate account with the updated billing data for use in processing future account-on-file transactions, and wherein the card profile data of the transmitted enhanced update response enables the merchant to provide additional value added services to a cardholder of the candidate account.

19. The computer-readable storage media in accordance with claim 18, wherein the card profile data includes at least one of fraud history, a loyalty customer profile, a chargeback history, historical transaction data, a customer loyalty profile, a spending behavior, location information, and cardholder information associated with the candidate payment account.

20. The computer-readable storage media in accordance with claim 18, wherein the computer-executable instructions further cause the processor to:

compare the current billing data associated with the candidate payment account retrieved from the billing database to a merchant billing data record associated with previous update requests; and determine whether the current billing data for the candidate payment account has been updated since the previous update requests.

21. The computer-readable storage media in accordance with claim 18, wherein the computer-executable instructions further cause the processor to include at least a portion of the retrieved current billing data in the generated card profile query, before transmitting the card profile query to the card profile database.

22. The computer-readable storage media in accordance with claim 18, wherein the computer-executable instructions further cause the processor to transmit the card profile query to the payment processor, to cause the payment processor to (i) retrieve the card profile data associated with the candidate payment account, from the card profile database and (ii) transmit the retrieved card profile data to the processor.

23. The computer-readable storage media in accordance with claim 18, wherein the computer-executable instructions further cause the processor to:

detect whether at least one of the merchant and the acquirer associated with the update request is registered for an ABCPU service; and generate the card profile query in response to the detection.

24. The computer-readable storage media in accordance with claim 23, wherein the computer-executable instructions further cause the processor to detect whether at least one of the merchant and the acquirer associated with the update request is registered for the ABCPU service, by performing a lookup of a list of registered users of the ABCPU service stored in the memory.

25. The computer-readable storage media in accordance with claim 23, wherein the computer-executable instructions further cause the processor to detect whether at least one of the merchant and the acquirer associated with the update request is registered for the ABCPU service, by determining whether the update request was received over a communication channel associated with the ABCPU service.

* * * * *